Figure 1:
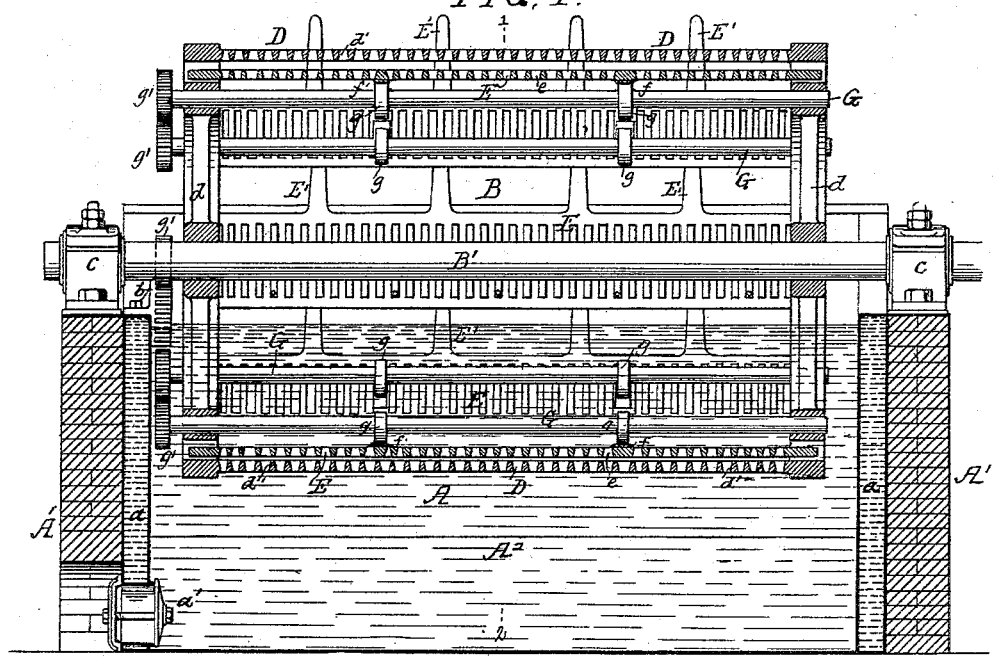

(No Model.)

S. T. PAUL
HARDENING APPARATUS FOR SAW BLADES, &c.

No. 401,206. Patented Apr. 9, 1889.

Witnesses:
Albert Popkins
Jas. L. Skidmore

Inventor:
Saml T. Paul
by his Attorneys
Howson & Howson

UNITED STATES PATENT OFFICE.

SAMUEL T. PAUL, OF PHILADELPHIA, PENNSYLVANIA, ASSIGNOR TO HENRY DISSTON & SONS, INCORPORATED, OF SAME PLACE.

HARDENING APPARATUS FOR SAW-BLADES, &c.

SPECIFICATION forming part of Letters Patent No. 401,206, dated April 9, 1889.

Application filed May 11, 1888. Serial No. 273,598. (No model.)

*To all whom it may concern:*

Be it known that I, SAMUEL T. PAUL, a citizen of the United States, and a resident of Philadelphia, Pennsylvania, have invented an Improved Hardening Apparatus for Saw-Blades, &c., of which the following is a specification.

The object of my invention is to thoroughly and quickly harden saw-blades and other blades of steel.

In hardening steel blades or strips, such as are used in the making of saws, it is desirable to harden them by heating the blades to a white heat and dip them in oil or other hardening-liquid and allow them to remain in this hardening-liquid for a certain length of time.

My device, as shown in the drawings, is constructed to harden saw-blades particularly; but it will be evident that it can be used for hardening other blades and strips as well.

It has been customary in hardening saw-blades to dip the blades in oil or other hardening-liquid one at a time. This operation occupies considerable time, and as the price obtained for the saws does not warrant the giving of sufficient time for the thorough hardening of the blade the blades are at times very unevenly hardened; but by my apparatus the saw-blades can remain in the oil the required time, so as to thoroughly and evenly harden the blades.

Figures 2, 3:
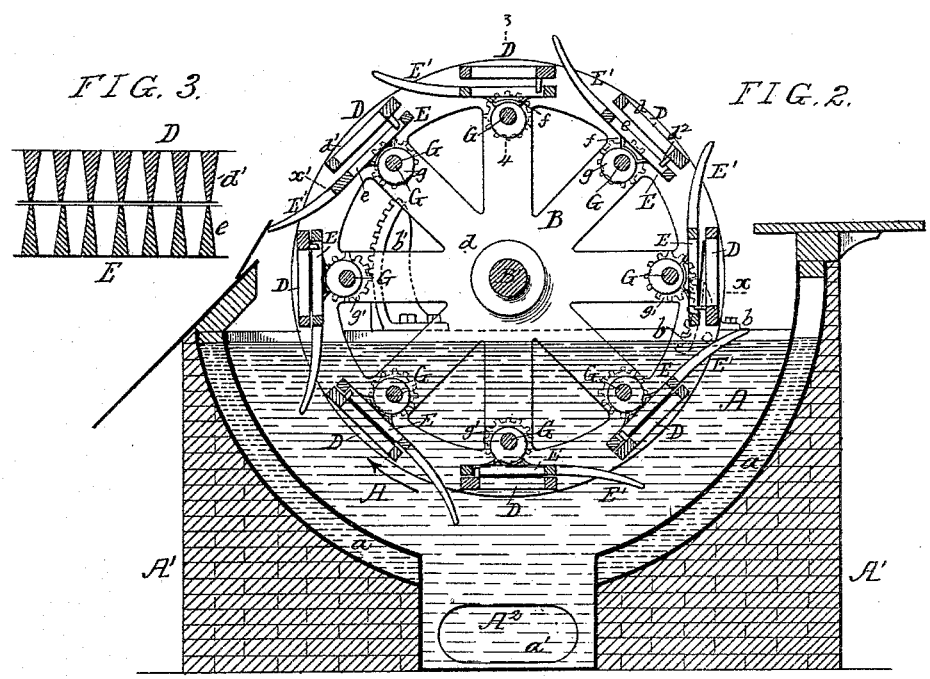
Figure 4:
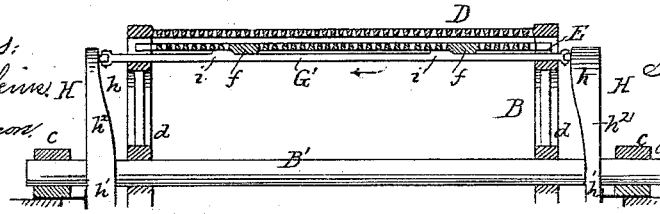

In the accompanying drawings, Figure 1 is a longitudinal section of my improved apparatus. Fig. 2 is a transverse section on the line 1 2, Fig. 1; and Fig. 3 is a section on the line 3 4, Fig. 2, of the grids enlarged. Fig. 4 is a view of a modification.

Mounted in suitable brick-work, A', is the tank A, in which is mounted the revolving carrier for the saw-blanks. Surrounding this tank A is a water-jacket, $a$, through which water circulates to keep the oil in the tank as cool as possible.

In the bottom of the tank A is formed a trough or depression, $A^2$, into which the sediment and dirt settle during the process of hardening. A man-hole, $a'$, at one end of this trough allows for the removal of the sediment at intervals.

Mounted in bearings $c\ c$ on the tank is a shaft, B', carrying a drum, B, composed, in the present instance, of two side disks, $d\ d$, and a series of longitudinal tie-plates, D. These tie-plates are in the form of grids, having vertical ribs $d'$, tapered, as shown in Fig. 3, for a purpose described hereinafter.

In the drawings I have shown eight of these grids; but it will be evident that more or less than this number may be used without departing from my invention.

On the inner side of the grids and in line therewith are a series of movable frames, E, having cross-bars $e$ in the same plane as the cross-bars of the grid D. In fact, each of these frames also forms a grid. The cross-bars are tapered toward the longitudinal grids, so that when a saw-blade is clamped between a frame, E, and a grid, D, oil can gain access to all parts of the saw, as the edge where the cross-bars of the grid and frame come in contact with the saw is very narrow.

The frames E slide in radial slots in the side disks, $d$, and each frame is forced toward its grids by the following devices:

G is a shaft mounted in suitable bearings in the side disks, $d\ d$, and on this shaft are one or more cams, $g$, acting upon a spring-bearing, $f$, on the frame. At one end of each shaft G is preferably a gear-wheel, $g$, and on one portion of the frame-work or tank is a rack, $b$, and on another portion a rack, $b'$. As the grids revolve, the gear-wheels are revolved one half-turn by the rack $b$, the cams forcing the frames toward the grids, holding the saws in the confined position during the passage through the oil from the point $x$ to the point $x'$; but as soon as the saw is removed from the oil the gear-wheels strike the rack $b'$, and each frame is released and allows the hardened saw to drop out onto a suitable table.

On each grid D are lugs $d^2$, which extend into the frame E. On these lugs rests the saw-blade to be hardened when placed in position, as shown in Fig. 2, and on each frame E are prongs or guides E', which serve not only to guide the saw-blank into the space between the grid and frame, but also act as a skid on which the released and hardened blank slides when it reaches the point $x'$, as shown in Fig. 2. Thus it will be seen that the delivery of the hardened blanks is automatic, and that by increasing or diminishing the speed of revolution of the drum the blanks can remain in the oil any length of time required.

The operation of the device is as follows: The shaft of the drum is driven through any suitable mechanism, either a fast and loose pulley or friction driving-gear. Oil is placed in the tank A. The blades to be hardened are first inserted into a heating-furnace, and when at white heat are removed and placed between one of the grids D and a movable frame, E, and as the drum B slowly revolves the frame gradually presses the blade against the grid D, and when the point $x$ is reached the blade is securely held between the two to prevent buckling while passing through the oil. When the blade reaches the point $x'$, the frame E is withdrawn by the rack $b'$ and the hardened blade falls out upon a suitable table, the skids E' guiding the blade.

I do not limit myself to the precise device shown in Figs. 1 and 2 for operating upon the frames E, as the frames may be moved by the devices which I will now proceed to describe, referring to Fig. 4.

The frames slide in radial slots in the side disks, $d$, as mentioned above, and each frame E is provided with lugs or cams $f$ on the rear, which engage at certain times during the revolution of the drum with lugs $i$ on a cam-rod, G', situated in the rear of each of the frames.

H H are stationary cams having two planes, $h\ h'$, on different lines and connected together by inclines $h^2$. As the drum revolves, the cam-rods G are acted upon by the cams H, so as to move the frames E toward the grids D or to release the frames. The cams are so arranged that the saws will be clamped in the frames from the point $x$, Fig. 2, to the point $x'$, which is the time the saws are in the oil; but the cams are so arranged that the frames are released at $x'$ and open and remain open until they reach the point $x$, after which they are closed, and the portions $h'$ of the cam acting to press the frames against the grids, while the portions $h$ act to force the rod G' in the direction of its arrow, Fig. 4, releasing the frame E from the control of the bar.

Friction-rollers may be provided at the ends of each bar, if desired, to bear against the cams, as shown.

I claim as my invention—

1. The combination of the tank and the drum having a series of grids with movable frames, with devices acting upon said movable frames to clamp the saw-blank or other blade between the grid and frame, substantially as described.

2. The combination of the tank, the rotatable drum mounted in bearings thereon and having a series of grids, with movable frames opposite said grids, and cams adapted to clamp said movable frames to the grids, substantially as described.

3. The combination of the drum formed of a series of grids, a series of frames opposite the series of grids, and a cam-shaft with cams thereon, with pinions on the end of each cam-shaft, and racks with which the pinions engage to move the frames toward or from the grids, substantially as and for the purpose described.

In testimony whereof I have signed my name to this specification in the presence of two subscribing witnesses.

SAMUEL T. PAUL.

Witnesses:
 WILLIAM D. CONNER,
 HARRY SMITH.